July 20, 1937.
E. D. WILSON ET AL
2,087,368
DEVICE FOR FUMIGATING
Filed March 10, 1934
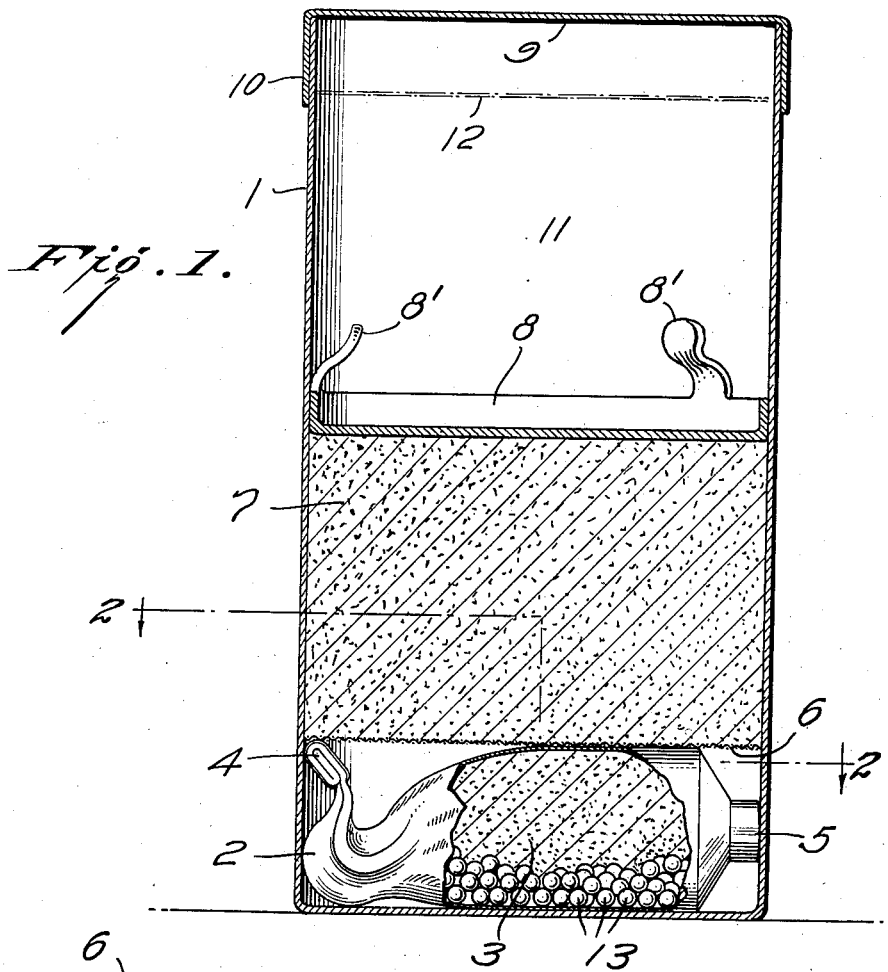
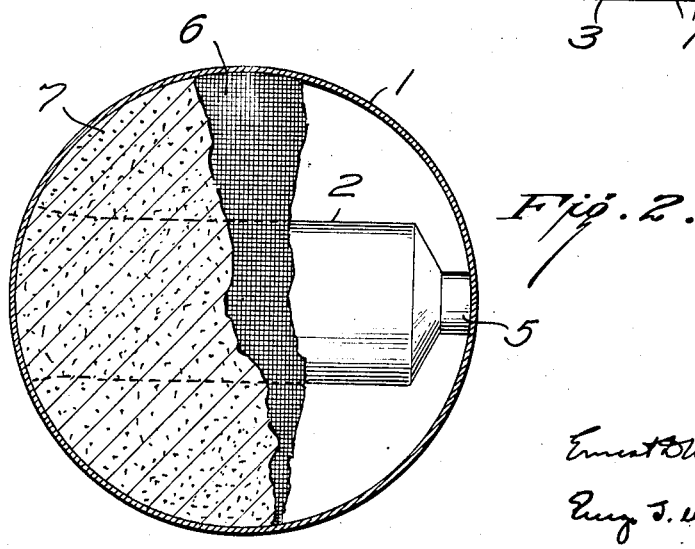
INVENTORS, Patented July 20, 1937

2,087,368

UNITED STATES PATENT OFFICE 2,087,368

DEVICE FOR FUMIGATING

Ernest D. Wilson, Larchmont, and George G. Wittwer, Chappaqua, N. Y., assignors to W-B Chemical Company, New York, N. Y., a corporation of New York Application March 10, 1934, Serial No. 714,942

11 Claims. (Cl. 167—35)

This invention relates to packages, more particularly to fumigating devices and containing two or more substances which are adapted to react under certain controlled conditions.

This invention is more specifically directed to a combination of such substances which will react due to the addition of suitable liquids, such as water, the reaction resulting in the production of a gas or vapor, such as a fumigant, which is expelled from the solution and is liberated into the space to be fumigated.

Still more specifically the invention is directed to the production of HCN in the gaseous state by the reaction of a solution of a cyanide, such as NaCN, with a suitable salt, the metal ion of which is capable of combining with the cyanide ion to form an unstable salt. Due to the instability of such a cyanide and, aided by or due to, in most cases, the evolution of heat in the reaction, substantially all of the HCN is quickly liberated with a high efficiency of reaction and in toxic concentrations.

Fumigating with HCN as regularly practiced heretofore, consisted in one instance in producing HCN in the liquid state and liberating the same as a gas by atomizing the liquid under suitable conditions. There were various disadvantages in such a procedure in that liquid HCN was dangerous to manufacture, handle and transport, both because of its extremely low boiling point and its great toxicity and the impossibility of with certainty preventing decomposition and consequently explosion of the liquid. The use of liquid HCN in fumigation further required expensive and delicate apparatus and highly skilled operators to correctly apply the same.

Another process previously used consisted in providing a pot in which a cyanide in solid form or in solution was placed and adding thereto sulphuric acid to cause a reaction to take place to liberate HCN gas. In some cases the sulphuric acid was in the pot and the cyanide was introduced therein. This also had serious disadvantages in that the acid was difficult to handle. It often splattered due to the violence and velocity of the reaction and thus ruined surrounding material, and the reaction took place so rapidly that it was dangerous for the operator, making it necessary for him to wear a gas mask while conducting the fumigation with its attendant difficulties.

There has also been proposed the use of calcium cyanide in powder or in flake form which, by the reaction thereof with moisture of the air liberated HCN in toxic concentrations. This procedure had disadvantages in that in some cases the liberation of HCN was too slow and there was always a residue that had to be removed in most instances requiring additional labor. Often the evolution of the HCN was not sufficiently rapid to give the desired fumigating effect. Sometimes machines were used to speed up the fumigation but they were costly, involved additional trouble and required skilled operators.

The present invention is intended to overcome the difficulties and disadvantages of prior art methods and to provide a safe and effective composition contained in a package which may be handled without danger of liberation of HCN prematurely. It further provides safety in that the operator after having added the water, for instance, to the contents of the package is not immediately subjected to fumes of HCN because the present invention provides for a delayed action giving the operator sufficient time to get away from the place being fumigated before evolution of HCN begins and he need not wear a gas mask. The new fumigating package provides a space therein which acts as a measuring device indicating to the operator the exact amount of liquid to be added to the ingredients in order to give the desired proportions of water, cyanide and salt for the most effective action.

The invention in one of its forms is illustrated in the accompanying drawing on which like reference characters indicate like parts:

Figure 1 is a vertical cross-sectional view of a package made in accordance with this invention; and Figure 2 is a horizontal cross-sectional view taken along the line 2—2 of Figure 1.

Referring to the drawing, there is provided a container 1 of cardboard or the like, coated or impregnated with paraffin or other substance which is waterproof and which will not be affected by the salts in the package, by the liberated gas or by the temperature generated therein. In the bottom of the container is a tube 2 filled with anhydrous $AlCl_3$ or other suitable salt 3 and the ends 4 and 5 thereof are sealed and they are usually jammed against the inner walls of the container 1 so as to keep the tube in place and to prevent it from moving about in the container. The tube 2 is made of any suitable material, such as paper, aluminum, etc., which will be affected by water or by a cyanide solution, whereby it is perforated, disintegrated or dissolved.

Immediately above the tube is a perforated metal screen 6 which may rest upon the tube 2 or may be held by contacting with the sides of the container. The member 6 is generally made of a metal or a material which is not affected by cyanide solutions or the like. Upon the member 6 is placed a suitable amount of a substance 7 which will react with the salt 3 to give a gaseous material, such as the alkali and the alkali-earth metal cyanides. Above the cyanide 7 is a paper or other separator 8 having tabs 8' to be grasped by the fingers for the removal of the separator which normally holds the cyanide in place and prevents it from moving about within the container. A cover 9 of material similar to container 1 has its side edge 10 fitted to the container and is sealed onto the same to prevent the entrance of air and moisture. This provides a space 11 between cover 9 and separator 8 for holding water or other liquid. A line 12 or other mark is provided within the container to indicate the level to which liquid should be added for the purpose of the reaction.

Assuming that the salt 3 is anhydrous aluminum chloride and the salt 7 is sodium cyanide and the tube 2 is of aluminum, the procedure to produce HCN is as follows: Water is added up to line 12 in container 1 and after a short time the paper separator 8 is disintegrated. If desired, the separator may be first removed and the water may be added directly to the cyanide. The water flows into the sodium cyanide 7 and forms a cyanide solution of the desired strength. The solution passes through the perforations of element 6 and comes into contact with the aluminum tube. This is soluble in the cyanide solution and in a regulated time depending upon the thickness and character of the aluminum the same will become perforated and the cyanide solution will flow into contact with the aluminum chloride. A rapid reaction occurs between the cyanide and the salt as follows:

$$3NaCN + AlCl_3 = Al(CN)_3 + 3NaCl$$

The aluminum cyanide is unstable and will immediately react with the water present in the following manner:

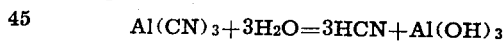

$$Al(CN)_3 + 3H_2O = 3HCN + Al(OH)_3$$

At least some of the HCN tends to remain in the solution, but the large amount of heat generated in the reactions involving aluminum chloride and cyanide produces a sufficiently high temperature so that substantially all of the HCN is expelled from the solution. It passes upwardly through the solution, through the screen 6, through the top of the container and into the space to be fumigated.

While we have described a single embodiment of our invention, it is apparent that numerous modifications are possible within the principles above described. Other salts than sodium cyanide and aluminum chloride may be used and other liquids may be substituted for the water. In some cases it may not be necessary to wedge the tube 2 against the side of the container in order to hold it in place. For example, shot 13 may be placed within the tube to hold it on the bottom of the container, or the weight of the tube itself may be sufficient to prevent it from rising during the reaction. It may even be feasible to omit the perforated separator or screen 6 and allow the cyanide to rest directly upon and around the tube 2. The separator 8 is not at all essential and is generally used for convenience only. The tube 2 need not be made of aluminum but may be made of paper or other material which will be suitably affected by the solution used as described above. When a paper tube is used, it is generally of thin paper which is easily disintegrated upon contact with water, and we prefer to impregnate it with suitable material which will protect the aluminum chloride and the like from contact with moisture and still not prevent the penetration of the cyanide solution. Stearic acid is an example of the materials available for this purpose. Instead of placing the aluminum chloride in a tube, we may coat the particles thereof with such substances as stearic acid, which will protect the same against moisture and will give the desired delayed action of the cyanide solution thereon. When aluminum is used for the tube, it may be suitably alloyed or amalgamated to speed up the dissolution thereof by the cyanide solution. These and other changes may be made in the specific embodiment herein described, all such changes being contemplated as within the spirit of this invention, the scope of which is outlined in the claims attached hereto.

What we claim is:

1. A package comprising a moisture-proof container, two separate bodies of dry chemicals, one being a water-soluble cyanide compound, the other a salt capable of reacting with the cyanide compound to evolve a gaseous cyanide with evolution of heat, a wrapper enclosing one of said two bodies of chemicals, said wrapper being of material which will disintegrate after a time in an aqueous solution of the other body of chemicals, said wrapper and its contents being located in the lower part of the container, and a non-liquid-tight support within said container over the said wrapper, supporting the other body of chemicals which is not in the wrapper, said container being dimensioned to provide an empty space capable of holding sufficient water to cause a substantially complete chemical reaction between the two bodies of chemicals.

2. A package comprising a moisture-proof container, two separate bodies of dry chemicals, one being a water-soluble cyanide compound, the other a salt capable of reacting with the cyanide compound to evolve a gaseous cyanide with evolution of heat, a wrapper enclosing said salt, said wrapper being of material which will disintegrate after a time in an aqueous solution of the cyanide, said wrapper and its contents being located in the lower part of the container, and a non-liquid-tight support within said container over the said wrapper, supporting the cyanide, said container being dimensioned to provide an empty space capable of holding sufficient water to cause a substantially complete chemical reaction between the two bodies of chemicals.

3. A package comprising a moisture-proof container, two separate bodies of dry chemicals, one being a water-soluble cyanide compound, the other a salt capable of reacting with the cyanide compound to evolve a gaseous cyanide with evolution of heat, a wrapper enclosing said salt, said wrapper being of material which will disintegrate after a time in an aqueous solution of the cyanide, said wrapper and its contents being located in the lower part of the container, a non-liquid-tight support within said container over the said wrapper, supporting the cyanide, and a removable partition in the container on top of the body of cyanide, said container being dimensioned to provide an empty space capable of holding sufficient water to cause a substantially complete chemical reaction between the two bodies of chemicals.

4. A device for effecting the delayed evolution of a fumigating gas by the addition of water, which comprises a container, a body of a salt in the bottom of the container, and a body of a water-soluble cyanide in said container above the salt, said salt being capable of reacting with an aqueous solution of said cyanide to evolve a gaseous cyanide and being separated from the cyanide by a substance normally impervious to moisture but subject to disintegration by the action of said aqueous cyanide solution, the container having a space above said cyanide capacitated to contain sufficient water to form the desired aqueous solution of said cyanide.

5. A device for effecting the delayed evolution of a fumigating gas by the addition of water, which comprises a container, a body of anhydrous aluminum chloride in the bottom of said container, and a body of a water-soluble cyanide in said container above the chloride, said chloride being separated from the cyanide by a substance normally impervious to moisture but subject to disintegration by the action of an aqueous solution of said cyanide, the container having a space above said cyanide capacitated to contain sufficient water to form the desired aqueous solution of said cyanide.

6. A device for effecting the delayed evolution of a fumigating gas by the addition of water, which comprises a container, a body of anhydrous aluminum chloride in the bottom of said container, and a body of a water-soluble cyanide in said container above the chloride, said chloride being enclosed in a wrapper comprising paper, the container having a space above said cyanide capacitated to contain sufficient water to form a suitable aqueous solution of said cyanide.

7. A device for effecting the delayed evolution of a fumigating gas by the addition of water, which comprises a container, a body of anhydrous aluminum chloride in the bottom of said container, and a body of water-soluble cyanide in said container above the chloride, said chloride being enclosed in a wrapper comprising paper impregnated with stearic acid, the container having a space above said cyanide capacitated to contain sufficient water to form a suitable aqueous solution of said cyanide.

8. A device for effecting the delayed evolution of a fumigating gas by the addition of water, which comprises a container, a body of anhydrous aluminum chloride in the bottom of said container, and a body of a water-soluble cyanide in said container above the chloride, said chloride being enclosed in a wrapper comprising aluminum, the container having a space above said cyanide capacitated to contain sufficient water to form a suitable aqueous solution of said cyanide.

9. A device for effecting the delayed evolution of a fumigating gas by the addition of water, which comprises a container, a body of a salt in the bottom of the container, and a body of a water-soluble cyanide in said container above the salt, said salt being capable of reacting with an aqueous solution of said cyanide to evolve a gaseous cyanide, said salt being enclosed in a wrapper capacitated to be disintegrated by the action of said aqueous cyanide solution, the container having a space above said cyanide capacitated to contain sufficient water to form the desired aqueous solution of said cyanide.

10. A device for effecting the delayed evolution of a fumigating gas by the addition of water, which comprises a container, a support in said container capacitated to permit flow of liquid past the same, a body of a water-soluble cyanide on said support, and a body of a salt capable of reacting with an aqueous solution of said cyanide to evolve a gaseous cyanide located in the container below said support, said salt being enclosed in a wrapper capacitated to be disintegrated by the action of such aqueous cyanide solution, the container having a space above said cyanide capacitated to contain sufficient water to form the desired aqueous solution of said cyanide.

11. A device for effecting the delayed evolution of a fumigating gas, which comprises a container, a body of a salt in the bottom of said container, a body of a soluble salt in the container above said first named salt, the first named salt being capable of reacting with a solution of said soluble salt to evolve a fumigating gas and being enclosed in a wrapper capacitated to be disintegrated by such solution, the container having a space above the body of soluble salt capacitated to contain sufficient liquid to form the desired solution.

ERNEST D. WILSON.
GEORGE G. WITTWER.